2 Sheets—Sheet 1.
S. COMFORT, Jr.
HARVESTER.
No. 14,553.　　　　　　　　　　　Patented Apr. 1, 1856.
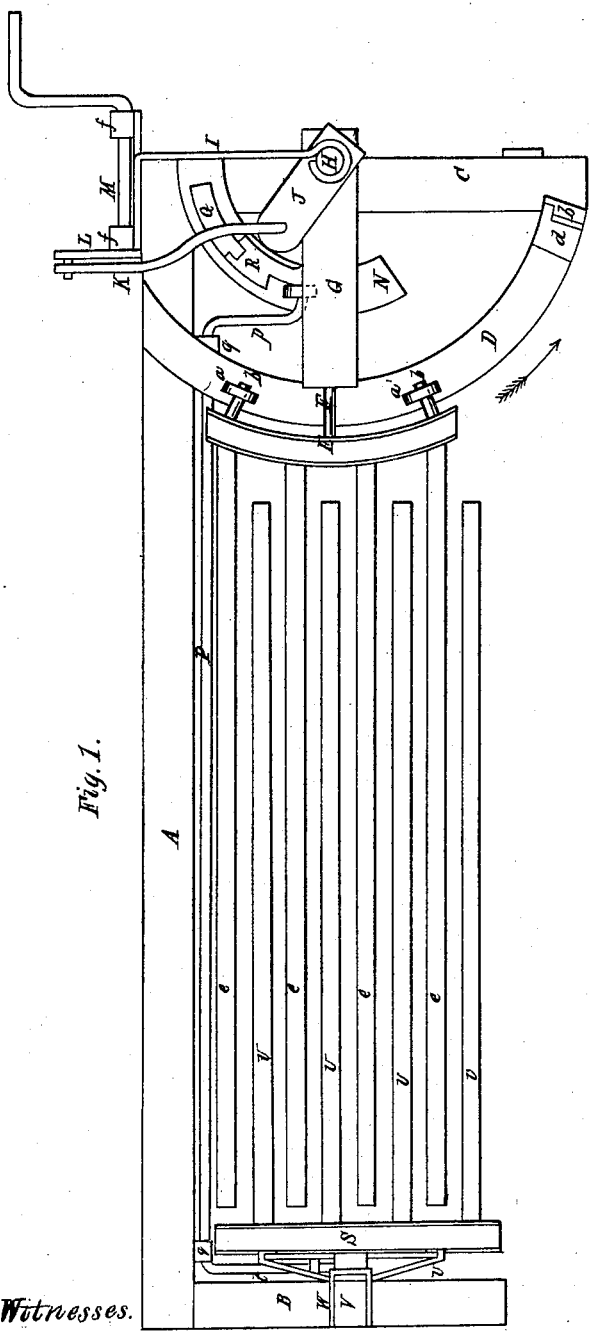
Fig. 1.
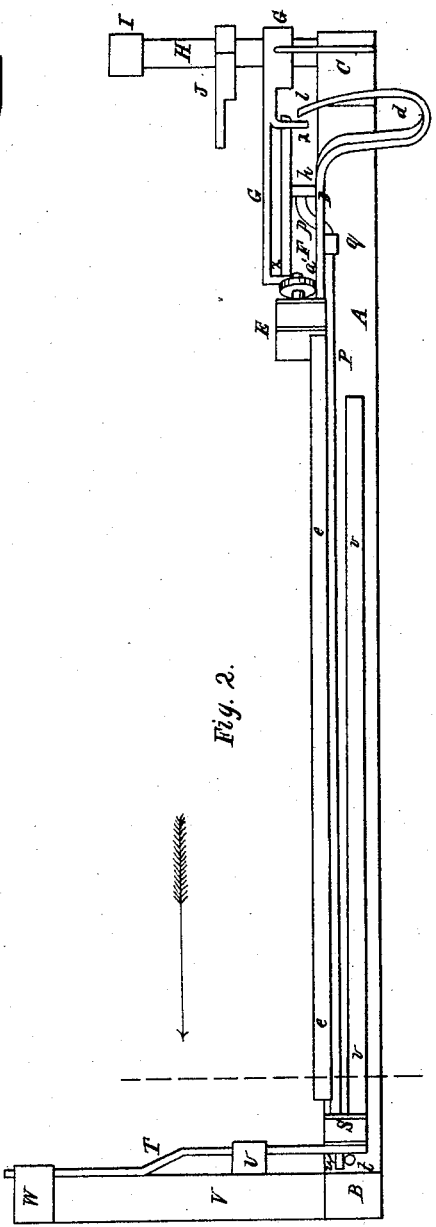
Fig. 2.
Witnesses.

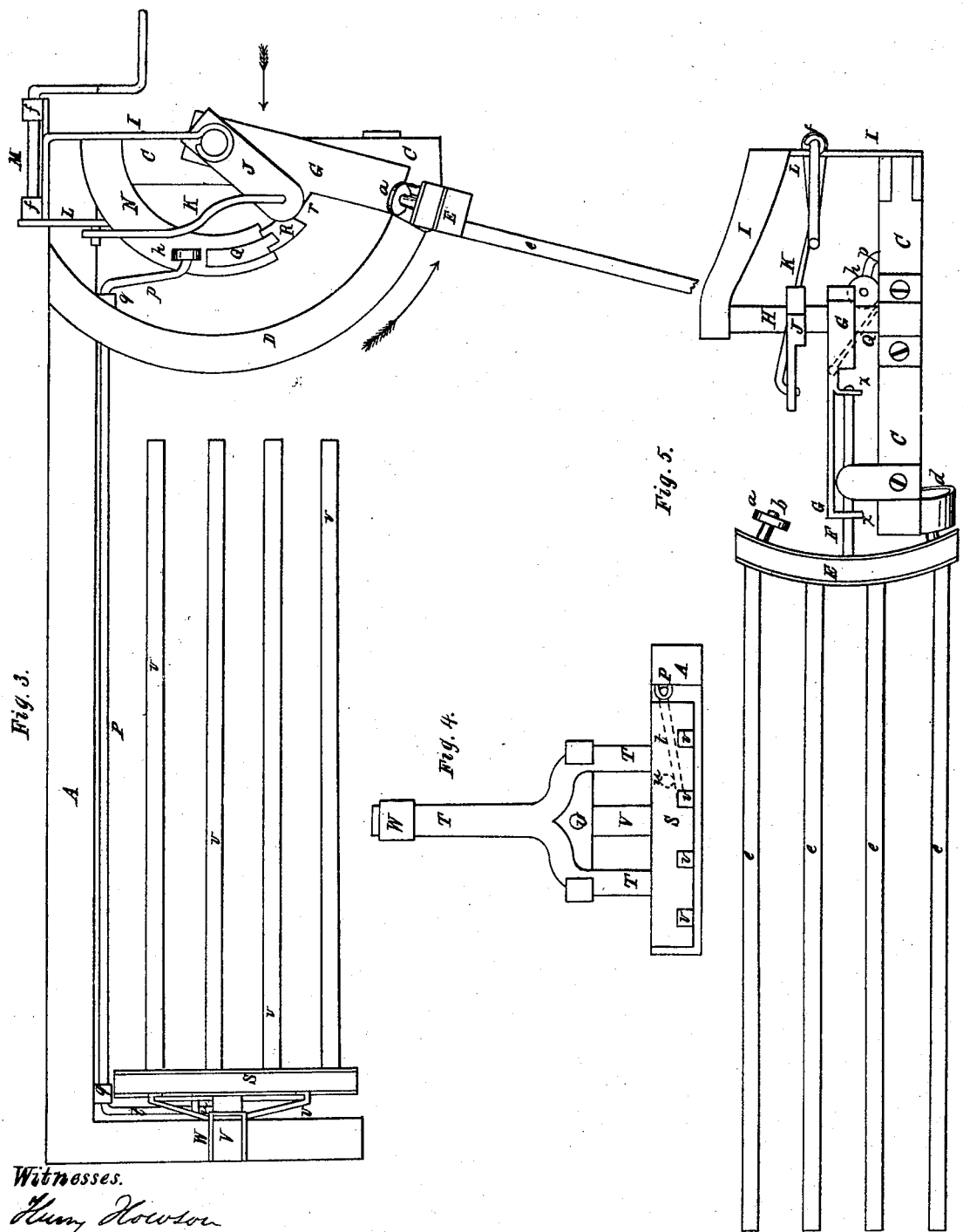

UNITED STATES PATENT OFFICE.

SAMUEL COMFORT, JR., OF MORRISVILLE, PENNSYLVANIA.

IMPROVED APPARATUS FOR REMOVING GRAIN FROM HARVESTERS.

Specification forming part of Letters Patent No. 14,553, dated April 1, 1856.

*To all whom it may concern:*

Be it known that I, SAMUEL COMFORT, Jr., of Morrisville, Bucks county, Pennsylvania, have invented a new and Improved Apparatus to be Attached to Harvesters for Removing the Cut Grain or Grass; and I do hereby declare that the following is a full, clear, and exact description of the same, reference being had to the accompanying drawings, and to the letters of reference marked thereon.

My invention consists in the employment behind the cutter-bars of harvesters of a grated platform and radial grating constructed in the manner described hereinafter. To the former a vertical reciprocating motion is imparted, and to the latter a radial as well as tilting motion, these motions being produced by means of inclined planes, levers, rods, and cranks, operated from any moving part of the harvester, and more fully described hereinafter. The radial grating and grated platform are so arranged and operated that the grain or grass falling on the latter may, by means of its vertical reciprocating movement, be deposited on the former, which, by its radial movement, conveys it one side of the machine, and by its tilting movement turns it over onto the ground. The whole is designed for the purpose of avoiding the friction produced by the use of the automatic rakes usually employed for effecting the same purpose.

In order to enable others skilled in the art to make and use my invention, I will now proceed to describe its construction and operation.

On reference to the drawings which form a part of this specification, Figure 1 is a plan view of my improved apparatus for removing grain or grass from harvesters; Fig. 2, an edge view of the same; Fig. 3, a plan showing the radial grating in a different position to that shown in Fig. 1; Fig. 4, a sectional view on the line 1 2, Fig. 2, and looking in the direction of the arrow; Fig. 5, an end view of Fig. 3, looking in the direction of the arrow.

The same letters of reference allude to similar parts throughout the several views.

A represents either the cutter-bar of any harvester or a bar at the back of the cutter-bar. To one end of the bar A, and at right angles to the same, is secured the bar B, and to the opposite end the bar C. The outer end of the latter is connected to the bar A by a curved plate, D. This plate, near its junction with the end of the bar C, is bent down so as to form a curved recess, $d$, (see Fig. 2,) for a purpose hereinafter described. On the curved plate D rest the two rollers $a$ and $a'$, which are hung loose on pins $b$ and $b'$, the latter being secured one near each end of the curved bar E, to which are secured any convenient number of rods $e\ e\ e\ e$, which form what I have termed the "radial grating" of my machine. To the curved bar E is also secured a shaft or spindle, F, which is arranged so as to turn freely in lips $x\ x$, projecting from the under side of the arm G, the latter being permanently secured to the vertical spindle H, which has its upper bearing in the bracket I, secured to the cutter-bar A. (See Fig. 5.) To the vertical spindle H is secured the lever J, connected by means of the rod K to the crank L on the end of the spindle M, which has its bearings in lugs $f\ f$ on the bracket I. Near the junction of the bar A with the bar C is secured another curved plate, N, on which rests the roller $h$ at the end of the cranked portion $p$ of the horizontal shaft P, when the said roller $h$ is not raised from the said plate by the inclined plane Q, which is jointed to the projection R, the latter being attached to or forming a part of the arm G. The projection R has a piece cut out near its junction with the arm G, so as to form an opening, $r$, for a purpose hereinafter set forth. The shaft P traverses the back of the bar A, and has its bearings in brackets $q\ q$, secured to the same, the end of the shaft being cranked at $t$, and this cranked portion bearing against the under side of a pin, $u$, which projects from and is secured to the back of the bar S. From the front of the latter project a series of rods, $v\ v\ v\ v$, which are so arranged that when the apparatus is in the position shown in Fig. 1 the said rods coincide with the spaces between the rods $e\ e$ of the radial grating. The bar S, with its projecting rods $v\ v\ v\ v$, I term the "grated platform" of the machine. To the back of the bar S' is secured the guide T, (see Fig. 4,) the lower legs of which slide in a bracket, $u$, on the upright piece V, which is secured to the bar B, the upper leg being guided in a sleeve, W, attached to the top of the upright.

Operation: The harvester to which the above-described apparatus is attached being drawn over the ground, and motion being communicated from any working part of the machine to the shaft M, the following operations will take place: Supposing the apparatus to be in the position shown in Figs. 1 and 2, and that a quantity of the cut grain or grass which it is required to remove on one side be spread over the rods e e e of the radial grating. The crank L is now at its farthest outward extent, and by the turning of the spindle M in either one direction or the other the rod K must operate on the lever J, so as to turn the vertical spindle H, and with it the arm G, as well as the shaft F and curved bar E, with its rods e and superincumbent grain or grass, in the direction of the arrow. During this movement of the radial grating it remains in a horizontal position until the roller a′ coincides with the top of the curved recess d in the plate D. The roller then striking against the projecting lip l must, on the continued movement of the spindle M, descend into this recess, and thereby turn the radial grating over on its edge, as seen in Figs. 3 and 5; or it may be turned farther over than this by regulating the length of the crank L to suit the amount of turning over required. During the above movements it will be observed that the inclined plane Q passed freely over the roller h, and that consequently the position of the latter, as well as of the grated platform, remained undisturbed, the grain or grass being continually deposited upon the latter as the machine is drawn over the ground. The crank L having now arrived at its extreme inward stroke, a further turning of the spindle M will cause the radial grating, as the roller a′ is removed from the recess d, to resume its former horizontal position before it can reach the grated platform. However, the inclined plane Q bears with its point against the under side of the roller h, and as the inclined plane advances elevates the same, turning the shaft P so that its cranked portion t shall, by bearing against the under side of the pin u, raise the bar S and rods v v v v of the grated platform, together with the grain or grass collected thereon, a sufficient height to allow the radial grating to pass underneath. The moment the bars e e of the radial grating, however, coincide with the spaces between the rods v v of the grated platform, the roller h coincides with the space r cut out of the projection R at the head of the inclined plane Q, and the roller h dropping through this space drops to its former position on the curved plate N, and the grated platform consequently drops by its own weight to its former position, leaving the grain or grass remaining on the bars of the radial grating ready to be removed by a further turning of the spindle M, and a repetition of the above-described movements.

It will be thus seen that as the machine is drawn over the ground the radial grating takes the cut grain or grass from the grated platform and conveys it to one side of the machine and turns it over onto the ground. In other contrivances for effecting the same purpose it is usual to rake the grain or grass into a compact bundle or to draw it round upon a stationary platform, by both which methods considerable friction is produced. By avoiding entirely the use of a rake and simply lifting the grain or grass and conveying it to one side the above objectionable features are overcome.

What I claim, and desire to secure by Letters Patent, is—

1. The employment, in harvesters, of the grated platform and radial grating, the same being constructed and operating in conjunction with each other, substantially in the manner and for the purpose herein set forth.

2. The radial grating with its two rollers, a and a′, shaft F, and arm G, as connected to the shaft H, in combination with the curved plate D and its curved recess d, (the said shaft H being actuated in the manner set forth, or any equivalent to the same,) for the purpose of turning over the said radial grating and clearing it of the grain or grass.

3. The arm G, with its projection R, recess r, and jointed inclined plane Q, in combination with the shaft P, its cranked portions t and p, and roller h for the purpose of giving the grated platform the desired vertical movement.

SAMUEL COMFORT, Jr.

Witnesses:
HENRY HOWSON,
WILLIAM E. WALTON.